No. 695,093. Patented Mar. 11, 1902.
U. G. CRAMPTON.
SOAP HOLDER FOR SHAVING CUPS.
(Application filed Aug. 30, 1901.)
(No Model.)
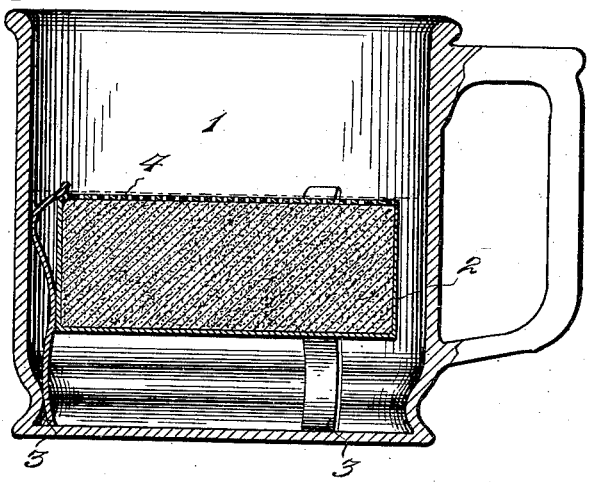
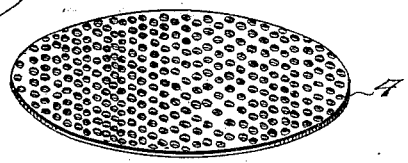
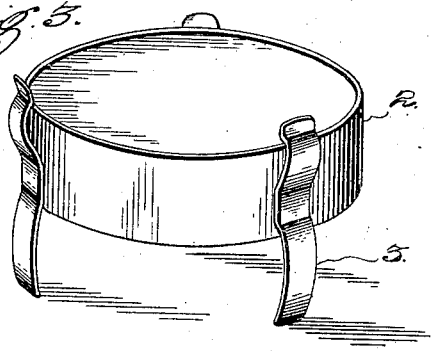
Witnesses
U. G. Crampton, Inventor
by
Attorneys

UNITED STATES PATENT OFFICE.

ULYSSES G. CRAMPTON, OF TYRONE, PENNSYLVANIA.

SOAP-HOLDER FOR SHAVING-CUPS.

SPECIFICATION forming part of Letters Patent No. 695,093, dated March 11, 1902.

Application filed August 30, 1901. Serial No. 73,874. (No model.)

*To all whom it may concern:*

Be it known that I, ULYSSES G. CRAMPTON, a citizen of the United States, residing at Tyrone, in the county of Blair and State of Pennsylvania, have invented a new and useful Soap-Saving Device, of which the following is a specification.

My invention has for its object to provide a soap-saving device for shaving-cups; and it comprises a protective casing to prevent unnecessary and wasteful contact of the soap with the water in the cup and a foraminous lid or top plate designed to protect the upper surface of the cake of soap.

A further object of the invention is to insure cleanliness of the shaving-cup, and thus prevent the growth of bacteria and harmful micro-organisms.

In the accompanying drawings, Figure 1 is a sectional elevation of a shaving-cup, illustrating a soap-holding device arranged and constructed in accordance with my invention. Fig. 2 is a perspective view of the foraminous top plate for the protection of the soap. Fig. 3 is a similar view of the soap-holder.

Similar numerals of reference indicate corresponding parts throughout the various figures of the drawings.

1 designates a shaving-cup of any ordinary character. Within the cup is placed a holder 2 in the form of a cylindrical casing having a closed bottom and an open top, the casing being of the shape and size of the cake of soap which it is adapted to receive. On the periphery of the casing are secured a number of legs 3 in the form of spring-plates, the upper portions of which are bent outwardly for frictional contact with the inner surface of the shaving-cup and are designed to hold the casing in place and at the same time afford an open space between the periphery of the casing and the cup for the reception of water. The casing will prevent contact of the water with the bottom and side of the cake of soap and at the same time will prevent any contact of the soap with the cup, and thus prevent any accumulations of particles of soap at the bottom of the cup, the cup being thus kept in a cleanly condition.

On the upper surface of the cake of soap is placed a foraminated disk 4, preferably formed of sheet metal, or it may be of wire-gauze or some similar material which will permit of the formation and escape of lather, while preventing any unnecessary and wasteful contact of the lathering-brush with the upper surface of the soap. The disk 4 is of a diameter slightly less than the internal diameter of the casing 2, and as the cake of soap wears away it will follow the cake and remain in operative position until the cake of soap has been entirely consumed. Owing to the presence of the disk all portions of the cake of soap must be worn away, so as to preserve a flat upper face, and a cake may be used in its entirety and without the waste which usually occurs when the cake is worn away in the center and is broken into a number of small pieces. The springs 3 support the casing somewhat above the bottom of the cup and affords a space for quantity of water sufficient for the purpose, the water-level being normally at about the top of the disk 4, so that there will be but little or no water in contact with the soap, and thus prevent the waste which occurs when any body of water is introduced and permitted to rest even for a short space of time upon the surface of the cake of soap, as in an ordinary shaving-cup. The space between the soap-casing and the shaving-cup is of sufficient width to permit the necessary moistening of the brush for the formation of lather, while at the same time the sides and bottom of the soap-casing will absolutely prevent any contact of the water with all portions of the surface of the soap except the top surface, where partial protection is afforded by the disk 4. The extreme upper ends of the legs are bent inwardly and may act as guides for the disk 4 when the latter is first placed in position. The disk should be formed of very thin metal and provided with perforations or with slits numerous enough to permit of the action of the brush-bristles against the surface of the soap.

Various modifications in the form and proportions of the device may be made without departing from the spirit or sacrificing any of the advantages of the invention.

Having thus described my invention, what I claim is—

1. A soap-holder for shaving-cups, comprising a casing of a diameter less than that of the cup, said casing conforming to the shape of the cake of soap and covering and protecting the sides and bottom of the same from contact with water, and a movable foraminated disk adapted to cover the upper surface of the cake of soap.

2. A soap-holder for shaving-cups, comprising a casing of a diameter less than that of the cup, and conforming to the shape of the cake of soap and covering and protecting the sides and bottom of the same from the action of water, and a movable foraminated disk adapted to cover the upper surface of the cake of soap, said disk being of a diameter less than the diameter of the casing, substantially as specified.

3. A soap-holder for shaving-cups, comprising a casing of a diameter less than that of the cup and adapted to cover and protect the sides and bottom of a cake of soap, a movable foraminated disk adapted to cover the upper surface of the cake of soap, and means for supporting said casing above the bottom of the shaving-cup.

4. A soap-holder comprising a casing having spacing-springs adapted for contact with the interior of a cup, and a movable foraminated top piece adapted to cover the cake of soap.

5. A soap-holder comprising a casing, supporting-legs thereon, said legs having their upper portions outwardly bent for engagement with the side of the shaving-cup and having their extreme upper ends inwardly bent, and a foraminated top piece guided between the upper ends of said legs.

In testimony that I claim the foregoing as my own I have hereto affixed my signature in the presence of two witnesses.

ULYSSES G. CRAMPTON.

Witnesses:
J. BRADFORD RUSSELL,
W. F. TAYLOR.